United States Patent
Bening et al.

(10) Patent No.: US 11,384,273 B2
(45) Date of Patent: Jul. 12, 2022

(54) DRILLING FLUID COMPOSITIONS

(71) Applicant: Kraton Polymers LLC, Houston, TX (US)

(72) Inventors: Robert C Bening, Houston, TX (US); Harry Jerrold Miller, Savanah, GA (US); Jos H. M. Lange, Almere (NL)

(73) Assignee: KRATON POLYMERS LLC, Houston, TX (US)

( * ) Notice: Subject to any disclaimer, the term of this patent is extended or adjusted under 35 U.S.C. 154(b) by 0 days.

(21) Appl. No.: 17/248,246

(22) Filed: Jan. 15, 2021

(65) Prior Publication Data
US 2021/0222046 A1    Jul. 22, 2021

Related U.S. Application Data

(60) Provisional application No. 62/963,320, filed on Jan. 20, 2020.

(51) Int. Cl.
*C09K 8/34* (2006.01)
*E21B 43/16* (2006.01)

(52) U.S. Cl.
CPC ............. *C09K 8/34* (2013.01); *E21B 43/16* (2013.01)

(58) Field of Classification Search
None
See application file for complete search history.

(56) References Cited

U.S. PATENT DOCUMENTS

| | | | | |
|---|---|---|---|---|
| 4,072,194 A * | 2/1978 | Cole | .................. | C08J 3/092 405/129.55 |
| 5,710,108 A * | 1/1998 | McNally | ................. | C09K 8/08 507/116 |
| 5,853,048 A * | 12/1998 | Weaver | ................... | C09K 8/56 166/279 |
| 6,209,643 B1 * | 4/2001 | Nguyen | ............... | E21B 43/025 507/924 |

* cited by examiner

*Primary Examiner* — John J Figueroa

(57) ABSTRACT

A drilling fluid composition having a controlled viscosity with the addition of a polyamide as a rheology modifier. The polyamide having has an acid value from 10 mg KOH/g to 200 mg KOH/g is obtained from a reactant mixture comprising: one or more polycarboxylic acids and one or more polyamines. The polycarboxylic acid is selected from the group of polycarboxylic acids having a carboxylic acid functionality of two or more, an average number of carboxylic acid functionalities of from 2 to 4, and having from 2 to 60 carbon atoms, wherein at least one of the polycarboxylic acids is derived from a dimer fatty acid. The polyamine is selected from the group of polyamines having an amine functionality of two or more selected from the group of primary and secondary amino groups, an average number of amine functionalities of from 2 to 4, and having from 2 to 36 carbon atoms.

19 Claims, No Drawings

DRILLING FLUID COMPOSITIONS

CROSS-REFERENCE TO RELATED APPLICATIONS

This application claims priority from U.S. Provisional Application No. 62/963,320, with a filing date of Jan. 20, 2020, which disclosure is incorporated herein by reference.

TECHNICAL FIELD

The disclosure relates to drilling fluid compositions and rheology modifiers for use in drilling fluid compositions.

BACKGROUND

Drilling fluid or mud is a specially designed fluid that is circulated through a wellbore, as the wellbore is being drilled to facilitate the drilling operation. Drilling fluids facilitate the removal of drill cuttings from the wellbore, cool and lubricate the drill bit, aid in supporting the drill pipe and drill bit, and provide a hydrostatic head to maintain the integrity of the wellbore walls thereby minimizing the potential for well blowouts. Oil or synthetic-based mud, or invert emulsions, are normally used to drill swelling or sloughing shale, salt, gypsum, anhydrite or other evaporate formations, hydrogen sulfide-containing formations, and hot (greater than about 300° F.) holes, but may be used in other holes penetrating a subterranean formation as well. All-oil mud typically comprises 100% oil by volume as the liquid phase, with no aqueous phase. An invert emulsion drilling fluid may commonly comprise between about 50:50 to 95:5 by volume oil phase to water phase.

Solid weighting agents such as barium sulfate (barite) are often used to adjust the fluid density in invert emulsion drilling fluid. To prevent settling of these materials, rheology modifiers, or viscosifiers such as organophilic clay and certain organic materials, such as tall oil fatty acid (TOFA) dimer/trimer products are used to provide the rheology needed to suspend solids. Ideally, these viscosity modifiers increase the viscosity/shear stress of the fluid at low shear rates, without causing an excessive increase in the high-shear viscosity, making it difficult for pumping and well pressure management. Additionally, the fluid should exhibit minimal change in rheology with temperature over a broad a temperature range as possible, e.g., from 40° F. or less for off-shore applications to 350° F. or higher.

There is a need for improved viscosity modifiers that are effective at increasing the low shear rate rheology in invert emulsion drilling fluids for applications including on-shore.

SUMMARY

In one aspect, the disclosure relates an oil-based drilling fluid comprising a polyamide as a rheology modifier. The polyamide is characterized as having an acid value from 10 mg KOH/g to 200 mg KOH/g, obtained from a reactant mixture comprising: one or more polycarboxylic acids and one or more polyamines. The polycarboxylic acid is selected from the group of polycarboxylic acids having a carboxylic acid functionality of two or more, an average number of carboxylic acid functionalities of from 2 to 4, and having from 2 to 60 carbon atoms, wherein at least one of the polycarboxylic acids is a dimer fatty acid or a derivative thereof. The polyamine is selected from the group of polyamines having an amine functionality of two or more selected from the group of primary and secondary amino groups, an average number of amine functionalities of from 2 to 4, and having from 2 to 36 carbon atoms. The drilling fluid composition is characterized as having a Low Shear Yield Point (LSYP) of at least 15 lb/100 ft$^2$ at a temperature ranging from 40-150° F.

In another aspect, the disclosure relates a method for drilling in a subterranean formation with an oil-based drilling fluid comprising a polyamide as a rheology modifier, the drilling fluid has a Low Shear Yield Point (LSYP) of at least 15 lb/100 ft$^2$ at a temperature ranging from 40-150° F. The polyamide is characterized as having an acid value from 10 mg KOH/g to 200 mg KOH/g, obtained from a reactant mixture comprising: one or more polycarboxylic acids and one or more polyamines.

DESCRIPTION

The following terms used the specification have the following meanings:

Rheology modifiers may be used interchangeably with viscosity modifiers, or emulsifiers.

Drilling fluid may be used interchangeably with "drilling mud," or "oil-based mud" (OBM), or oil-based drilling mud, or invert emulsion drilling fluid.

Plastic Viscosity or "PV" refers to a resistance of fluid to flow. According to the Bingham Plastic model, the PV is the slope of shear stress and shear rate, with the viscometer being utilized to measure shear rates at 600, 300, 200, 100, 6, and 3 revolutions per minute (rpm). A low PV indicates that the mud is capable of drilling rapidly because of the low viscosity of mud exiting at the bit. High PV is caused by a viscous base fluid and by excess colloidal solids. PV can measured with a viscometer reading at 600 rpm minus the viscometer reading at 300 rpm.

Yield Point ("YP") is resistance of initial flow of fluid or the stress required in order to move the fluid, or the attractive force among colloidal particles in drilling fluid. Per Bingham plastic model, YP is the shear stress extrapolated to a shear rate of zero.

Low shear yield point ("LSYP") is an alternative for determining drilling fluid yield stress from industry standard Couette viscometer data. LSYP can be calculated as: LSYP=2*DR$_3$−DR$_6$; lbs/100 ft$^2$. DR$_3$ and DR$_6$ refer to the dial reading from a viscometer, e.g., Brookfield viscometer, at 3 rpm and 6 rpm respectively.

The disclosure relates to an additive composition that can be added to drilling fluid in low levels as a rheological modifier, and still produce a large increase in YP, LSYP, and gel strength values. The additive composition comprises a polyamide. In embodiments, in addition to the polyamide, the drilling fluid comprises weighting agents and at least an oil.

Polyamide Component: The polyamide component is a reaction product of a reactant mixture comprising one or more polycarboxylic acids, wherein one of the applied polycarboxylic acids is a dimer acid, and one or more polyamines.

The term aromatic refers to aromatic compounds, also known as arenes or aromatics, which are chemical compounds that comprise conjugated planar ring systems with delocalized pi electron clouds instead of discrete alternating single and double bonds, and satisfy Hückel's rule. Aromatic compounds can be monocyclic or polycyclic and may contain one or two heteroatoms selected from O and S. Aromatic ring systems include benzene, naphthalene, thiophene, biphenyl, furan, anthracene, benzothiophene, dibenzothiophene, benzofuran, dibenzofuran, and phenanthrene.

The term aliphatic refers to chemical compounds which do not comprise an aromatic moiety. Aliphatic compounds can contain one or more open-chain (straight or branched) and cyclic moieties (monocyclic, bicyclic, or tricyclic) and combinations thereof, and may contain one or two non-conjugated unsaturated carbon-carbon double bonds, and may have an ether (—O—), sulfide (—S—), or sulfone (—SO$_2$—) moiety incorporated in their chemical structure.

The polyamide forming reaction can be conducted in one or more stages wherein the polycarboxylic acid reactants, or cyclic dicarboxylic anhydride equivalents thereof, can be added to the reaction at different stages during the reaction. For example, the reaction can be performed in two subsequent stages, wherein in the first stage of the reaction, an excess amount of polyamine is used such that the intermediate product has a high amine value, e.g., an amine value (mg KOH/g equivalent) in the range of 20 to 200. Thereafter, the intermediate product in the second stage is reacted with one or more polycarboxylic acids, or one or more cyclic anhydrides, resulting in a polyamide product having an acid value ranging from 10 mg KOH/g to 200 mg KOH/g, with an average amide functionality of two or more and an amine value of less than 20 mg KOH/g.

Alternatively, one or more polyamines can be reacted with one or more polycarboxylic acids, optionally in the presence of a cyclic dicarboxylic anhydride, in a one-step procedure, wherein one of the applied polycarboxylic acids is a dimer acid, and wherein the total number of functional carboxylic acid (—CO$_2$H or carboxyl) moieties is higher than the total number of polyamine functional amine (amino) moieties. The reaction results in a polyamide component having an acid value ranging from 10 mg KOH/g to 200 mg KOH/g, with an average amide functionality of two or more and an amine value of less than 20 mg KOH/g.

The polycarboxylic acid is selected from the group consisting of polycarboxylic acids having from 2 to 60 carbon atoms, with carboxyl group functionality of greater than or equal to 2, for an average number of carboxyl functionality ranging from 2 to 4, and with at least one of the polycarboxylic acids being derived from a dimer acid.

In embodiments, a suitable polycarboxylic acid includes aromatic polycarboxylic acids, aliphatic polycarboxylic acids and mixtures thereof. In another embodiment, a suitable polycarboxylic acid includes phthalic acid, isophthalic acid, terephthalic acid, homophthalic acid, trimellitic acid, 1,2,4,5-benzenetetracarboxylic acid, 1,2,3-benzenetricarboxylic acid, 1,3,5-benzenetricarboxylic acid, 1,2,3,4-benzenetetracarboxylic acid, 4,4'-stilbenedicarboxylic acid, biphenyl-4,4'-dicarboxylic acid, naphthalenedicarboxylic acids, phenanthrenedicarboxylic acids, anthracenedicarboxylic acids, glutaric acid, 3,3-dimethylglutaric acid, adipic acid, 3-methyladipic acid, oxalic acid, malonic acid, methylmalonic acid, dimethylmalonic acid, ethylmalonic acid, succinic acid, 2,2-dimethylglutaric acid, 3-methylglutaric acid, methylsuccinic acid, 2,2-dimethylsuccinic acid, sebacic acid, pimelic acid, azelaic acid, brassylic acid, suberic acid, dodecanedioc acid, 1,4-cyclohexanedicarboxylic acid, 1,3-cyclohexanedicarboxylic acid, 1,2-cyclohexanedicarboxylic acid, fatty acid dimer, partly hydrogenated fatty acid dimer, hydrogenated fatty acid dimer, diphenic acid, 2,5-furandicarboxylic acid, camphoric acid, norbornene-2,3-dicarboxylic acid, norbornane-2,3-dicarboxylic acid, 1,2,3-propanetricarboxylic acid, 1,2,3,4-butanetetracarboxylic acid, 1,2,4-butanetetracarboxylic acid, mixtures thereof and stereoisomers thereof.

Reactants based on the polyfunctional carboxylic acid having one or more modified carboxylic acid moieties may be used in place of the polyfunctional carboxylic acid. For example, methylester derivatives of polyfunctional carboxylic acid may be used. In general, these structurally related reactants contain an acyl group that may react with a nucleophile (e.g., the amine group of a polyamine) via a nucleophilic acyl substitution mechanism.

Alternatively, a cyclic dicarboxylic anhydride derivative may be used as reactant instead of the corresponding difunctional carboxylic acid. A cyclic dicarboxylic anhydride, also referred to as cyclic anhydride, is an acid anhydride derived by loss of water between two carboxylic groups in the same molecule so as to close a ring. For example, succinic anhydride may be applied instead of succinic acid, or trimellic anhydride may be applied instead of trimellitic acid (benzene-1,2,4-tricarboxylic acid). An amine can react with such a cyclic anhydride wherein the anhydride ring is opened to form an amide bond and a carboxylic acid moiety.

In general, the amidation reaction of an amine with a cyclic anhydride will proceed faster than with a carboxylic acid. At high temperatures and prolonged reaction times, amines can react with a cyclic anhydride to form a cyclic imide derivative. In such case, the acid number of the resulting composition would decrease to a value near zero. Acid number determination of the reaction product can serve as a tool to assess the reaction course of an amine with a cyclic anhydride, for example, to estimate the degree of cyclic imide formation.

In embodiments, one or more polycarboxylic acids are selected from the group consisting of dicarboxylic acids, tricarboxylic acids and tetracarboxylic acids.

In embodiments, the main dimer acid component has two carboxylic acid groups. In embodiments, the dimer acid comprises a mixture of di- and tri-carboxylic acids.

The dimer acids, or dimer fatty acid, or dimerized fatty acids, are polycarboxylic acids, comprising predominantly dicarboxylic acids and in general a minor amount of trimerized unsaturated fatty acids having three carboxyl groups, prepared by dimerizing unsaturated tall oil fatty acids (TOFA), although alternatively some other vegetable fatty acids such as soya fatty acid can be used. The dimer acid CAS number is 61788-89-4.

In embodiments, the dimer acids are fully hydrogenated, partially hydrogenated, or not hydrogenated. In embodiments, dimer acids include products resulting from the dimerization of $C_{16}$ to $C_{18}$ unsaturated fatty acids. In some embodiments, the dimer acid has an average of about 20 to about 48 carbon atoms, an average number of carboxyl functionality ranging from 2 to 3, and the predominant carboxylic acid component has two carboxylic acid moieties. In embodiments, the dimer acid has an average of about 36 to 44 carbon atoms; the predominant carboxylic acid component has two carboxylic acid moieties, and 36 carbon atoms.

The polyamine is selected from the group of polyamines having an amine functionality of two or more, and selected from the group of primary and secondary amino groups, an average number of amine functionalities of from 2 to 4, and having from 2 to 36 carbon atoms. Examples include aliphatic polyamines and aromatic polyamines, e.g., di-, tri-, and polyamines, and their combinations. Non limiting examples of polyamines are ethylenediamine, trimethylenediamine, tetramethylenediamine, pentamethylenediamine, hexamethylenediamine, octamethylenediamine, diethylentriamine, meta-xylylene diamine, para-xylylene diamine, ortho-xylylene diamine, dimer fatty acid diamines, hydrogenated dimer fatty acid diamines, decamethylenediamine, piperazine, dodecamethylenediamine, 2,2,4(2,4,4)-trimethyl-1,6-hexanediamine, 4,4-diaminodicyclohexylmethane, 3-aminomethyl-3,5,5-trimethylcyclohexylamine, 1,4-diamino-methylcyclohexane, 1,2-diaminocyclohexane, 1,3-diaminocyclohexane, 1,4-diaminocyclohexane, diaminonaphthalenes, phenylenediamines, diaminobiphenyls and stereoisomers thereof.

In embodiments, the reaction forming the polyamide optionally includes one or more cyclic anhydrides, selected from the group of aliphatic anhydrides and aromatic anhydrides with 4 to 20 carbon atoms, wherein the cyclic anhydride reactant has optionally one or two additional carboxylic acid moieties. In some embodiments, a suitable cyclic anhydride includes phthalic anhydride, homophthalic anhydride, trimellitic anhydride, succinic anhydride, methylsuccinic anhydride, phenylsuccinic anhydride, hexahydrophthalic anhydride, 5-norbornene-2,3-dicarboxylic anhydride, cantharidin, methyltetrahydrophthalic anhydride, hexahydro-4-methylphthalic anhydride, 3,4,5,6-tetrahydrophthalic anhydride, 1,2,3,6-tetrahydrophthalic anhydride, 2-(carboxymethyl)succinic anhydride, 2-(tetrahydro-2,5-dioxo-3-furanyl)butanedioic acid, glutaric anhydride and mixtures thereof.

In embodiments, the polyamide is prepared from a reaction mixture, wherein the total carboxyl group functionality is higher than the total amine (amino) group functionality, for a ratio of carboxyl group functionality to amine group functionality of at least 1.0; or at least 1.1, or at least 1.2. The reaction mixture comprises: a) one or more polyamines; b) one or more polycarboxylic acids, where one of the applied polycarboxylic acids is a dimer acid; and c) optionally one or more cyclic anhydrides. In embodiments, no cyclic anhydride is added. In some embodiments, with the presence of one or more cyclic anhydrides, at least one of the cyclic anhydrides is trimellitic anhydride.

In one embodiment, the polyamide is prepared from a reaction mixture comprising a dimer acid, ethylenediamine, and trimellitic anhydride, wherein in the first stage dimer acid is reacted with molar excess of ethylenediamine to give an intermediate product having an amine value from 10 mg KOH/g to 200 mg KOH/g, or <15 mg KOH/g, or <25 mg KOH/g, or <150 mg KOH/g, which in the second stage is reacted with one or more polycarboxylic acids, or one or more cyclic anhydrides, resulting in a polyamide product having an acid value from 10 mg KOH/g to 200 mg KOH/g, or >15 mg KOH/g, or <40 mg KOH/g, or <150 mg KOH/g with an average amide functionality of two or more and an amine value of less than 20 mg KOH/g.

In one embodiment, the polyamide has an acid number ranging from 10 to 200, or 15-200 mg KOH/g, or 15-150, or 20-120, or 50-70, or from 30 to 100, or more than 12 mg KOH/g; a weight average molecular weight Mw (grams/mole) ranging from 1,000 to 20,000, or 1,500-15,000 g/mol, or 4,000-8,000 g/mol, or >1,500 g/mol, or >2,000 g/mol, or <10,000 g/mol; a ratio of weight average molecular weight Mw to number average molecular weight Mn ranging from 1.5 to 4.0, or from 2.2 to 3.0, or from 2.5 to 2.8, or less than 4.0; an amine number less than 20, or less than 10, or less than 5, or less than 2 mg KOH/g.

The amount of polyamide added to the drilling fluid ranges from 0.25 to 12 pounds per barrel (ppb) of the oil-based mud (OBM), or 0.5 to 6 ppb, or 0.75 to 2 ppm.

Other Components: The drilling fluid composition further comprises oil, brine, lime, a gelling agent, an emulsifier, and a wetting agent. The oil can be diesel oil, a synthetic oil, an alpha-olefinic oil, an olefin, or a non-synthetic oil such as mineral oil. The brine typically includes a salt such as calcium chloride, with a typical oil:brine ratio in the range of 60:40 to 75:25, or 70:30 (w/w). The gelling agent can be an organophilic clay such as amine-modified hectorite, bentonite and mixtures thereof. The organophilic clay increases the low shear viscosity of the drilling fluid composition which prevents the weighting agent from settling. The weighting agents include materials such as barite (barium sulfate), hematatite, calcium carbonate, galena, siderite and mixtures thereof.

Typical other ingredients may include modified lignite, polymers, oxidized asphalt, and gilsonite, These other ingredients can aid in controlling fluid loss at low temperatures. In embodiments, styrenic block copolymers, e.g., diblock styrene-isoprene block copolymers, are added as fluid loss control agents in amounts ranging from 0.5 to 10 ppg, or 1 to 6 ppg, or 2 to 4 ppg.

In embodiments, the weighting agent is added to the drilling mud to adjust the density, typically to between 9 and 18 pounds per gallon. Organophilic clay is added in in amounts of 2-10, or 4-8, or 3-4 ppb, depending on the amount of rheology modifiers used such that the clay provides adequate low-shear rheology for particle suspension without increasing the high-shear rheology to the point where pressure during circulation becomes excessive.

In embodiments, an emulsifier can also be added to the drilling fluid in order to form a more stable emulsion, in an amount of 2 to 20 ppb, or 6 to 12 ppb. The emulsifier may include organic acids, including but not limited to the monocarboxyl alkanoic, alkenoic, or alkynoic fatty acids containing from 3 to 20 carbon atoms, and mixtures thereof. Examples of this group of acids include stearic, oleic, caproic, capric and butyric acids.

In some embodiments, water in the form of brine is often used in forming the internal phase of the drilling fluids. Water can be defined as an aqueous solution which can contain from about 10 to 350,000 parts-per-million of metal salts such as lithium, sodium, potassium, magnesium, cesium, or calcium salts. In some embodiments, the ratio of water (brine) to oil in the emulsions is in the range of 97:3 to 50:50, or 90:10 to 60:40, or 80:20 to 70:30.

Preparation: The components are mixed together with a mixing device. In some embodiments, primary and secondary emulsifiers and/or wetting agents (surfactant mix) are added to the base oil (continuous phase) under moderate agitation. A water phase, typically a brine, may be added to the base oil/surfactant mix. In addition to polyamide as rheological modifier, other components such as optional fluid loss control materials, weighting agents and optional corrosion inhibition chemicals are also added. The agitation may then be continued to ensure dispersion of each ingredient and homogenize the resulting fluidized mixture Properties & Applications of the Drilling Fluid: A drilling fluid can be characterized by its mud weight, mass per unit volume. Mud weight can be reported in units of pounds/gallon (ppg). The mud weight typically ranges from 8 ppg up to 18 ppg depending upon the base oil of the drilling fluid.

When drilling fluid, carrying suspended solids, comes into contact with a porous, permeable formation such as sandstone, the drilling mud solid particles immediately enter the openings. As the individual pores become bridged by the larger particles, successively smaller particles are filtered out until only a small amount of the liquid passes through the openings into the formation. As such, the drilling mud solids are deposited as a filter cake on the bore-hole wall.

The polyamide rheology modifier effectively increases the low shear rate rheology in invert-type synthetic based and oil-based drilling muds, as evidenced by a high values for the Yield Point (YP), Low Shear Yield Point (LSYP) and gel strength, without producing excessive high shear rate viscosity, measured as the Plastic Viscosity (PV), especially at temperatures of 70° F. and higher. Rheological properties for drilling fluid can be measured with a rotational viscometer. In embodiments, the polyamide rheology modifier maintains or increases the low shear viscosity of the oil based drilling fluid, while simultaneously maintaining a substantially constant high shear viscosity of the oil based drilling fluid compared to a low shear viscosity and high shear viscosity of an oil based drilling fluid without the polyamide.

In embodiments, the drilling fluid with the polyamide rheology modifier exhibits a low shear yield point (LSYP) after hot roll (AHR) of at least 10 lbs/100 ft$^2$, or at least 15 lbs/100 ft$^2$ at a temperature ranging from 40-150° F.

In embodiments, the drilling fluid with the polyamide rheology modifier exhibits a Yield Point (YP) of >20 lb/100 ft$^2$, >25 lb/100 ft$^2$, or >30 lb/100 ft$^2$, or >40 lb/100 ft$^2$ at a temperature ranging from 40-150° F.

Examples: The following illustrative example is intended to be non-limiting.

Acid number was determined by a method according to ASTM D465-05 (2010), e.g., mass of potassium hydroxide (KOH) in milligrams required to neutralize one gram of chemical substance.

Viscosity was determined according to ASTM D2196, using a Brookfield viscometer, and conducted at 190 deg C. by using a #31 spindle.

Molecular weight distributions and the derived $M_n$, $M_w$, and $M_z$ values were determined by Gel Permeation Chromatography (GPC), according to ASTM D5296. Conversional calibration against polystyrene standards was applied.

Example 1: 950 g of a dimer fatty acid from Kraton Chemicals, LLC having a low monomer content (1.5 to 2%), about 81.8% dimer acids, about 16.7% polymer acids, and an acid number in the range of 190-196 was used as a reactant. The dimer acid was added to a reaction vessel and heated to 80° C. To this was added ethylenediamine EDA (242 g) over approximately 20 minutes. Once the addition was complete, the mixture was heated to 200° C. at approximately 3° C./min. After one hour hold, a catalytic amount of phosphoric acid was charged and the reaction proceeded for another two hours. The reaction was sampled for acid number (3.3 mg KOH/g) and amine number (65 mg KOH/g equivalent). Additional (89 g) of the same dimerized fatty acid was made. After an additional two hours reaction time, the reaction was sampled for acid number (4.8 mg KOH/g) and amine number (39 mg KOH/g equivalent) and 158 g of trimellitic anhydride was added. After 1.5 hours, the reaction was cooled and discharged, yielding a solid polyamide possessing roughly two carboxylic acid groups per chain, with acid number=63 mg KOH/g; amine number=1.7 mg KOH/g equivalent; and viscosity @ 190° C.=400 mPas.

Example 2: 950 g of the same dimerized fatty acid in Example 1 was added to a reaction vessel and heated to 80° C. To this was added ethylenediamine EDA (74.2 g) over approximately 20 minutes. Once the addition was complete, the mixture was heated to 200° C. at approximately 3° C./min. After one hour hold, a catalytic amount of phosphoric acid was charged and the reaction proceeded for another two hours. The reaction was sampled for acid number (50 mg KOH/g) and amine number (1.5 mg KOH/g equivalent). After an additional two hours reaction time, the reaction was sampled for acid number (47 mg KOH/g) and amine number (0.6 mg KOH/g equivalent), cooled and discharged yielding a solid polyamide with the following properties: acid number=45 mg KOH/g; amine number=0.5 mg KOH/g equivalent; Viscosity @ 190° C.=644 mPas, a Mw of 8774, Mz of 17581, Mw/Mn of 2.50, and Tg of −25.62° C.

Example 3: Example 2 was repeated but with the molar ratio of dimer acid to EDA was adjusted to 5:4, for a solid polyamide with acid number=36 mg KOH/g; amine number=0.2 mg KOH/g equivalent; Viscosity @ 160° C.=1182 mPas, a Mw of 11101, Mz of 20869, Mw/Mn of 2.68, and Tg of −24.03° C.

Examples 4-5: Two drilling fluid compositions were prepared with the rheology modifier being either the polyamide of Example 3, or a commercially available trimer fatty acid for a mud weight of 12 ppg (pounds per gallon). The trimer fatty acid has 0.5 to 1 wt. monomer acid, 44.5 wt. % dimer acid, and −55% trimer acid. The trimer fatty acid has an acid number in the range of 175-192, a saponification number of 201, a viscosity of 40.00 cs at 25° C., a pour point ° C. of 16 (60° F.). The primary emulsifier and secondary emulsifier are commercially available emulsifiers, comprising tall oil fatty acid and fatty amidoamine derivatives, respectively. The recipe is shown in Table 1:

TABLE 1

| Formulation | grams |
| --- | --- |
| Olefin base oil | 180.80 |
| 25 % CaCl$_2$ brine | 76.73 |
| Organoclay | 4.00 |
| Primary Emulsifier | 8.00 |
| Secondary Emulsifier | 2.00 |
| Lime | 3.00 |
| Fluid Loss Control | 1.50 |
| Barite (4.1 SG) | 232.67 |
| OCMA clay | 10.00 |
| Rheology Modifier | 0.75 |

To prepare the drilling fluid, base oil was added to a wide mouth jar. An air-driven high shear mixer was used to mix the mud. The primary and secondary emulsifiers were then added. The organophillic clay was added next, and allowed to mix for about 10 minutes. The rheology modifier was added next and was also mixed for about 10-15 minutes. Lime was then added and mixed for about 5 minutes. A 25% CaCl$_2$ brine solution was then added and was mixed for about 15 minutes. Simulated drill cuttings (known as OCMA clay which models the behavior of drill cuttings) were added and mixed for about 5 minutes. Then the weighting agent (API barite) was added to bring the weight to 12 ppg for the drilling fluid composition for testing purposes. The barite was added slowly to allow each increment to wet and homogenize before more was added. During this step, the mud builds substantial viscosity and its temperature increases due to friction. The mud was mixed for an additional 20 minutes following the last barite addition.

A number of rheological tests were conducted at the temperature stated, and results are showed in Tables 2 and 3 for the trimer fatty acid and Example 3 polyamide as rheology modifier respectively.

The gel strength measurements were made using a multispeed rotational viscometer (e.g., OFITE™ Model 900 or Fann™ multi-speed viscometer model 35) at 3 rpm and different temperatures, e.g., 70° F., 120° F., and 150° F., and after time intervals of 10 seconds, 10 minutes, and 30 minutes. Maximum deflection is recorded as gel strength.

The shear stress measurements were made using a multispeed rotational viscometer at 3, 6, 100, 200, 300 and 600 rpm at 70° F., 120° F., and 150° F. The results are reported as Dial Readings (DR) in units of lbs/100 ft$^2$, e.g., DR$_{600}$ refers to the 600 rpm dial reading. The Dial Readings (DR) are used to calculate the Plastic Viscosity (PV) in cP, Yield Point (YP) in lbs/100 ft$^2$, and Low Shear Yield Point (LSYP) also in lbs/100 ft$^2$.

$$PV = DR_{600} - DR_{300};$$

$$YP = DR_{300} - PV;$$

$$LSYP = 2*DR_3 - DR_6.$$

The gel strength is reported in lbs/100 ft.$^2$. Fluid loss was measured at 300° F. using a Fann Series 387 (500 mL) HTHP (high temperature, high pressure) Filter Press using a pressure drop of 500 psi (600 psi on the high pressure side, 100 psi on the low pressure side) according to API 13A; fluid loss is reported as twice the volume recovered in 30 minutes. Electrical stability was measures at 120° F. using an Emulsion Stability Meter (part #131-50) according to API 13B-2.

TABLE 2

Example 4 drilling mud with trimer fatty acid

| | Test Temp (° F.) | | | | |
|---|---|---|---|---|---|
| | 120 (BHR) | 40 | 70 | 120 | 150 |
| 600/300 | 57/37 | 148/85 | 110/64 | 52/34 | 48/31 |
| 200/100 | 30/21 | 62/38 | 47/30 | 27/19 | 25/17 |
| 6/3 | 8/7 | 10/8 | 8/7 | 7/6 | 6/5 |
| PV (cP) | 20 | 63 | 46 | 18 | 17 |
| YP (lb/100 ft$^2$) | 17 | 22 | 18 | 16 | 14 |
| LSYP (lb/100 ft$^2$) | 6 | 6 | 6 | 5 | 4 |
| Gel (10'/10"/30") | 10/22/25 | 8/15/20 | 7/14/20 | 7/13/19 | 6/14/19 |
| ES (V) | 611 | 601 | — | — | — |
| HTHP FL (mL) | — | 3.2 | — | — | — |

TABLE 3

Example 4 drilling mud with Example 3 polyamide

| | Test Temp (° F.) | | | | |
|---|---|---|---|---|---|
| | 120 (BHR) | 40 | 70 | 120 | 150 |
| 600/300 | 89/57 | 242/152 | 125/77 | 101/68 | 93/65 |
| 200/100 | 44/30 | 106/80 | 59/41 | 54/39 | 53/39 |
| 6/3 | 11/10 | 32/30 | 15/14 | 18/17 | 19/18 |
| PV (cP) | 32 | 90 | 48 | 33 | 28 |
| YP (lb/100 ft$^2$) | 25 | 62 | 29 | 35 | 37 |
| LSYP (lb/100 ft$^2$) | 9 | 28 | 13 | 16 | 17 |
| Gel (10'/10"/30") | 13/21/22 | 35/84/65 | 21/42/49 | 29/39/42 | 27/38/39 |
| ES (V) | 812 | 643 | — | — | — |
| HTHP FL (mL) | — | 3.0 | — | — | — |

As shown, rheological metrics indicative of efficient particle suspension (low sag) such as Yield Point (YP), Low Shear Yields Point (LSYP) and gel strength are much higher at the same concentration of the polyamide as compared to the trimer fatty acid, and with an increase from 70° F. to 150° F. The low temperature Plastic Viscosity value for the polyamide-modified mud is high, but the very high values of the low shear metrics suggest excellent performance could still be achieved at a lower polyamide concentration. For onshore drilling with oil-based mud, a PV at 150° F. is often of particular interest and particularly with a reasonable value of 28 cP. The electrical stability values indicate that both muds maintained good emulsion stability after aging, and both muds exhibit comparable fluid loss.

Examples 6-8: Additional drilling fluid compositions were prepared for a mud density of 14.0 ppg, one composition with the trimer fatty acid (previously used in Example 4), one composition with the polyamide of Example 1, and one composition with the polyamide of Example 2. The drilling composition recipe is shown in Table 4, and the compositions were made and tested according to the procedures in Examples 4-5. Test results are shown in Table 5 for the trimer fatty acid as rheology modifier, Table 6 for the polyamide of Example 1 as rheology modifier, and Table 7 for the polyamide of Example 2. HT Emulsifier is a commercially available fatty amidioamine emulsifier. Fluid loss additive is a polymeric fluid loss additive such as Pliolite, or a substituted styrene acrylate copolymer (pre-crosslinked).

TABLE 4

| 14.0 ppg Formulation | grams |
|---|---|
| Olefin base oil | 149.99 |
| 25 % CaCl$_2$ brine | 73.08 |
| Organoclay | 2.00 |
| HT Emulsifier | 10.00 |
| Wetting Agent | 1.50 |
| Lime | 4.00 |
| Fluid Loss Additive | 2.50 |
| HT Fluid Loss Additive | 2.50 |
| Barite (4.1 SG) | 328.5 |
| OCMA Clay | 10.00 |
| Rheology Modifier | 1.50 |

TABLE 5 trimer fatty acid as rheology modifier

| | Test Temp (° F.) | | | | |
|---|---|---|---|---|---|
| | 120 (BHR) | 40 | 70 | 120 | 150 |
| 600/300 | 195/123 | 235/133 | 203/116 | 99/63 | 71/47 |
| 200/100 | 99/69 | 103/64 | 88/61 | 50/34 | 38/25 |
| 6/3 | 27/27 | 21/21 | 20/19 | 17/16 | 14/13 |
| PV (cP) | 72 | 102 | 87 | 36 | 24 |
| YP (lb/100 ft$^2$) | 51 | 31 | 29 | 27 | 23 |
| LSYP (lb/100 ft$^2$) | 27 | 21 | 18 | 15 | 12 |
| Gel (10'/10"/30") | 25/26/26 | 30/32/32 | 28/29/29 | 23/24/24 | 20/21/22 |
| ES (V) | 1060 | 886 | — | — | — |
| HTHP FL (mL) | — | 2.6 | — | — | — |

TABLE 6 polyamide of Example 1

| | Test Temp (° F.) | | | | |
|---|---|---|---|---|---|
| | 120 (BHR) | 40 | 70 | 120 | 150 |
| 600/300 | 108/69 | NA/214 | 152/101 | 124/85 | 120/84 |
| 200/100 | 54/37 | 175/128 | 82/58 | 70/54 | 71/52 |
| 6/3 | 12/11 | 61/59 | 30/30 | 31/30 | 23/22 |
| PV (cP) | 39 | NA | 51 | 39 | 36 |
| YP (lb/100 ft$^2$) | 30 | NA | 50 | 46 | 48 |
| LSYP (lb/100 ft$^2$) | 10 | 57 | 30 | 29 | 21 |
| Gel (10'/10"/30") | 13/14/15 | 68/89/131 | 36/38/39 | 29/39/42 | 20/21/25 |
| ES (V) | 1012 | 919 | — | — | — |
| HTHP FL (mL) | — | 3.2 | — | — | — |

TABLE 7 the polyamide of Example 2

| | Test Temp (° F.) | | | | |
|---|---|---|---|---|---|
| | 120 (BHR) | 40 | 70 | 120 | 150 |
| 600/300 | 97/59 | NA/211 | 171/109 | 135/93 | 125/92 |
| 200/100 | 44/28 | 170/118 | 88/63 | 78/61 | 79/64 |
| 6/3 | 8/7 | 52/52 | 30/30 | 39/38 | 44/43 |
| PV (cP) | 38 | N/A | 62 | 42 | 33 |
| YP (lb/100 ft²) | 21 | N/A | 47 | 51 | 59 |
| LSYP (lb/100 ft²) | 6 | 52 | 30 | 37 | 45 |
| Gel (10'/10"/30") | 7/8/8 | 61/111/131 | 42/57/56 | 43/51/55 | 45/50/52 |
| ES (V) | 998 | 1022 | | | |
| HTHP FL (mL) | | 3.6 | | | |

As shown, rheological metrics indicative of efficient particle suspension (low sag) such as Yield Point (YP), Low Shear Yields Point (LSYP) and gel strength are much higher at the same concentration of the polyamide. In Table 7, the YP and LSYP increase from 70° F. to 150° F. The low temperature Plastic Viscosity value for the polyamide—modified muds are high, but the very high values of the low shear metrics suggest excellent performance can still be achieved at a lower polyamide concentration. The electrical stability values indicate that both muds maintained good emulsion stability after aging, and both muds exhibit comparable fluid loss.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A drilling fluid composition comprising an oil-based mud and a polyamide as a rheology modifier,
    wherein the polyamide is formed in a reaction of a mixture comprising:
        one or more polycarboxylic acids, wherein at least one of the polycarboxylic acids is a dimer acid,
        one or more polyamines, and
        optionally one or more cyclic anhydrides, and
        wherein the mixture of the one or more polycarboxylic acids and the one or more polyamines being present in sufficient amounts for a ratio of carboxyl group functionality to amine group functionality of at least 1.2;
    wherein the polyamide has an acid number of 15-150 mg KOH/g and an amine value of less than 5 mg KOH/g; 0.833-1.25 wherein the polyamide is present in the drilling composition in an amount ranging from 0.25 to 12 pounds of polyamide per barrel (ppb) of the oil-base mud; and
    wherein the drilling fluid composition has a Low Shear Yield Point (LSYP) of at least 15 lb/100 ft² at a temperature ranging from 40-150° F.

2. The drilling fluid composition of claim 1, wherein the drilling fluid composition has a Yield Point (YP) of >20 lb/100 ft² at a temperature ranging from 40-150° F.

3. The drilling fluid composition of claim 1, wherein the reaction mixture comprises one or more cyclic anhydrides.

4. The drilling fluid composition of claim 1, wherein the reaction occurs in two stages, and the reaction mixture comprises a molar excess of ethylenediamine and one or more cyclic anhydrides;
    wherein in a first stage of the reaction, the dimer acid is reacted with the molar excess of ethylenediamine to give an intermediate product having an amine value ranging from 10 to 200 mg KOH/g,
    wherein in a second stage of the reaction, the intermediate product reacts with the one or more polycarboxylic acids or the one or more cyclic anhydrides to form the polyamide composition,
    wherein the polyamide composition has an acid value ranging from 15 mg KOH/g to 150 mg KOH/g, an average amide functionality of at least 2, and an amine value of less than 5 mg KOH/g.

5. The drilling fluid composition of claim 1, wherein the polyamide has an acid number of 20-120 mg KOH/g and an amine value of less than 2 mg KOH/g.

6. The drilling fluid composition of claim 1, wherein the polyamide has a weight average molecular weight Mw (grams/mole) ranging from 1,000 to 20,000.

7. The drilling fluid composition of claim 1, wherein the polyamide has a ratio of weight average molecular weight Mw to number average molecular weight Mn ranging from 1.5 to 4.0.

8. The drilling fluid composition of claim 1, wherein the one or more polycarboxylic acids is a polycarboxylic acids having from 2 to 60 carbon atoms, having a carboxyl group functionality of at least 2, for an average number of carboxyl group functionality from 2 to 4.

9. The drilling fluid composition of claim 1, wherein the one or more polyamines is a primary and secondary amino groups, having an amine functionality of two or more, an average number of amine functionalities of from 2 to 4, and from 2 to 36 carbon atoms.

10. The drilling fluid composition of claim 1, wherein the one more polycarboxylic acid are dimer acids having an average of 20 to 48 carbon atoms, an average number of carboxyl functionality ranging from 2 to 3, and a predominant carboxylic acid component having two carboxylic acid moieties.

11. The drilling fluid composition of claim 10, wherein the dimer acids are derived from tall oil fatty acid.

12. The drilling fluid composition of claim 1, wherein one or more polycarboxylic acids are selected from the group consisting of phtalic acid, isophthalic acid, terephthalic acid, homophthalic acid, trimellitic acid, 1,2,4,5-benzenetetracarboxylic acid, 1,2,3-benzenetricarboxylic acid, 1,3,5-benzenetricarboxylic acid, 1,2,3,4-benzenetetracarboxylic acid, 4,4'-stilbenedicarboxylic acid, biphenyl-4,4'-dicarboxylic acid, naphthalenedicarboxylic acids, phenanthrenedicarboxylic acids, anthracenedicarboxylic acids, glutaric acid, 3,3-dimethylglutaric acid, adipic acid, 3-methyladipic acid, oxalic acid, malonic acid, methylmalonic acid, ethylmalonic acid, dimethylmalonic acid, succinic acid, 2,2-dimethylglutaric acid, 3-methylglutaric acid, methylsuccinic acid, 2,2-dimethyl succinic acid, sebacic acid, pimelic acid, azelaic acid, brassylic acid, suberic acid, dodecanedioc acid, 1,4-cyclohexanedicarboxylic acid, 1,3-cyclohexanedicarboxylic acid, 1,2-cyclohexanedicarboxylic acid, fatty acid dimer, partly hydrogenated fatty acid dimer, hydrogenated fatty acid dimer, diphenic acid, 2,5-furandicarboxylic acid, camphoric acid, norbornene-2,3-dicarboxylic acid, norbornane-2,3-dicarboxylic acid, 1,2,3-propanetricarboxylic acid, 1,2,3,4-butanetetracarboxylic acid, 1,2,4-butanetetricarboxylic acid, and stereoisomers thereof.

13. The drilling fluid composition of claim 1, wherein the one or more polyamines are selected from the group consisting of ethylenediamine, trimethylenediamine, tetramethylenediamine, pentamethylenediamine, hexamethylenediamine, octamethylenediamine, diethylenetriamine, meta-xylylene diamine, para-xylylene diamine, ortho-xylylene diamine, dimer fatty acid diamines, hydrogenated dimer fatty acid diamines, decamethylenediamine, piperazine, dodecamethylenediamine, 2,2,4(2,4,4)-trimethyl-1,6-hexanediamine, 4,4-diaminodicyclohexylmethane, 3-aminomethyl-3,5,5-trimethylcyclohexylamine, 1,4-diaminomethylcyclohexane, 1,2-diaminocyclohexane, 1,3-diaminocyclohexane, 1,4-diaminocyclohexane, diaminonaphthalenes, phenylenediamines, diaminobiphenyls and stereoisomers thereof.

14. The drilling fluid composition of claim 1, wherein the optional one or more cyclic anhydrides are selected from the group consisting of phthalic anhydride, homophthalic anhydride, trimellitic anhydride, succinic anhydride, methylsuccinic anhydride, phenyl succinic anhydride, hexahydrophthalic anhydride, 5-norbornene-2,3-dicarboxylic anhydride, cantharidin, methyltetrahydrophthalic anhydride, hexahydro-4-methylphthalic anhydride, 3,4,5,6-tetrahydrophthalic anhydride, 1,2,3,6-tetrahydrophthalic anhydride, 2-(carboxymethyl)succinic anhydride, 2-(tetrahydro-2,5-dioxo-3-furanyl)butanedioic acid, 1-propene-1,2,3-tricarboxylic acid anhydride, and glutaric anhydride.

15. A drilling fluid composition comprising an oil-based mud and a polyamide as a rheology modifier,
wherein the polyamide is formed in a reaction of a mixture comprising:
one or more polycarboxylic acids, wherein at least one of the polycarboxylic acids is a dimer acid,
one or more polyamines, and
trimellitic anhydride, and
wherein the mixture contains a sufficient amount of one or more polycarboxylic acids and one or more polyamines for a ratio of carboxyl group functionality to amine group functionality of at least 1.0;
wherein the polyamide has an acid number of at least 10 mg KOH/g and an amine value of less than 20 mg KOH/g;
wherein the polyamide is present in the drilling composition in an amount ranging from 0.25 to 12 pounds of polyamide per barrel (ppb) of the oil-base mud; and
wherein the drilling fluid composition has a Low Shear Yield Point (LSYP) of at least 15 lb/100 ft$^2$ at a temperature ranging from 40-150° F.

16. A method of drilling in a subterranean formation, the method comprising:
providing an oil based drilling fluid by combining an oil based continuous phase with a polyamide as a rheology modifier, the oil based drilling fluid having a low shear viscosity and a high shear viscosity, wherein the polyamide is a reaction product of a reactant mixture comprising:
one or more polycarboxylic acids, wherein at least one of the polycarboxylic acids is a dimer acid;
one or more polyamines; and
optionally one or more cyclic anhydrides;
wherein the mixture of the one or more polycarboxylic acids and the one or more polyamines being present in sufficient amounts for a ratio of carboxyl group functionality to amine group functionality of at least 1.2; and
wherein the polyamide has an acid number of 15-150 mg KOH/g and an amine value of less than 5 KOH/g; and
placing the oil based drilling fluid into the subterranean formation;
wherein the polyamide is present in the oil based drilling fluid an amount ranging from 0.25 to 12 pounds of polyamide per barrel (ppb) of the oil-base mud; and
wherein the oil based drilling fluid has a Low Shear Yield Point (LSYP) of at least 15 lb/100 ft$^2$ at a temperature ranging from 40-150° F.

17. The method of claim 16, wherein the oil based drilling fluid has a Yield Point (YP) of >20 lb/100 ft$^2$ at a temperature ranging from 40-150° F.

18. The method of claim 16, wherein the polyamide has an acid number of 20-120 mg KOH/g and an amine value of less than 2 mg KOH/g.

19. The method of claim 16, wherein the polyamide has a weight average molecular weight Mw (grams/mole) ranging from 1,000 to 20,000.

* * * * *

UNITED STATES PATENT AND TRADEMARK OFFICE
CERTIFICATE OF CORRECTION

PATENT NO. : 11,384,273 B2
APPLICATION NO. : 17/248246
DATED : July 12, 2022
INVENTOR(S) : Robert C Bening, Harry Jerrold Miller and Jos H. M. Lange Page 1 of 1

It is certified that error appears in the above-identified patent and that said Letters Patent is hereby corrected as shown below:

In the Claims

In Column 12, Line 20, delete "0.833-1.25" in its entirety.

Signed and Sealed this
Twenty-fifth Day of February, 2025

Coke Morgan Stewart
*Acting Director of the United States Patent and Trademark Office*